United States Patent [19]

Fauck

[11] 4,299,428
[45] Nov. 10, 1981

[54] AUTOMATIC LOAD-DEPENDENT BRAKE CONTROL DEVICE HAVING WIDE RANGE OF PRESSURE ADJUSTMENT

[75] Inventor: Gerhard Fauck, Hanover, Fed. Rep. of Germany

[73] Assignee: WABCO Fahrzeugbremsen GmbH, Hanover, Fed. Rep. of Germany

[21] Appl. No.: 155,332

[22] Filed: Jun. 2, 1980

[30] Foreign Application Priority Data

Jun. 20, 1979 [DE] Fed. Rep. of Germany ....... 2924836

[51] Int. Cl.³ .............................................. B60T 8/22
[52] U.S. Cl. .................................. 303/22 A; 188/195
[58] Field of Search ................ 303/22 R, 22 A, 23 A, 303/23 R, 28, 40, 29, 30; 188/195

[56] References Cited

U.S. PATENT DOCUMENTS 2,940,796  6/1960  Ortmann et al. ................. 303/22 A
3,583,772  6/1971  Reno ................................ 303/22 A

FOREIGN PATENT DOCUMENTS 2458008  6/1976  Fed. Rep. of Germany ... 303/22 A

Primary Examiner—Douglas C. Butler
Attorney, Agent, or Firm—G. J. Falce

[57] ABSTRACT

In a variable load valve device of the type employing a walking beam type lever arrangement via which the control and compensating pistons are interconnected to obtain load-dependent control of the brake pressure, there is provided a screw adjustment that acts through an auxiliary piston to vary the tension of a bias spring acting on one of the levers of the lever arrangement to bias the compensating piston in order to withhold the load-dependent brake control until a predetermined level of brake pressure is developed. The auxiliary piston is subject to brake control pressure supplied to the variable load valve inlet and in one embodiment of the invention, the auxiliary piston is formed to urge the piston in a direction to counteract the spring force and in another embodiment, to urge the piston in a direction to supplement the spring force.

8 Claims, 3 Drawing Figures

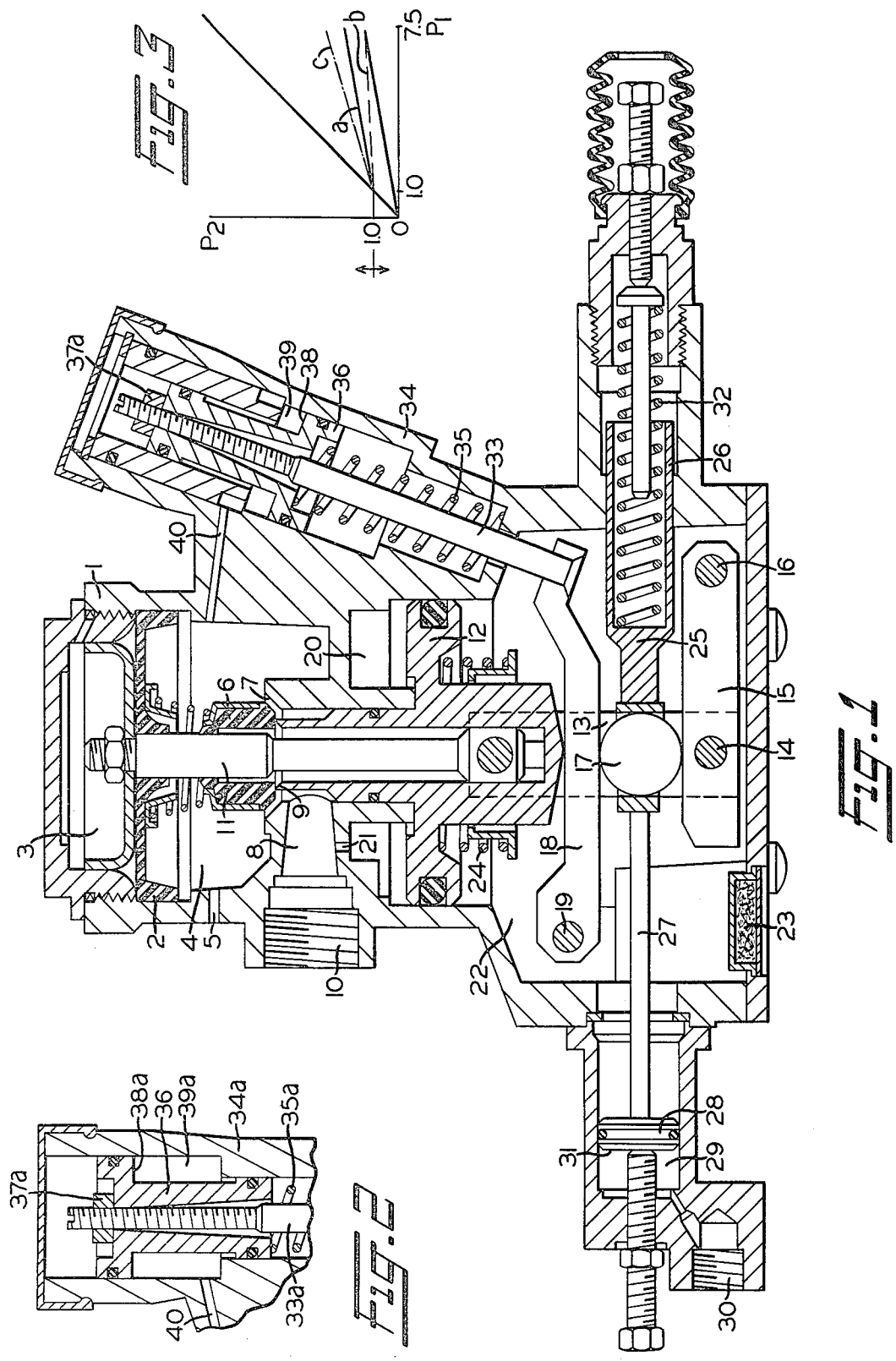

AUTOMATIC LOAD-DEPENDENT BRAKE CONTROL DEVICE HAVING WIDE RANGE OF PRESSURE ADJUSTMENT

BACKGROUND OF THE INVENTION

The present invention is related to load responsive brake apparatus and more particularly to a variable load valve device of the type in which the load proportioning aspect is provided by a lever arrangement for interconnecting the pistons controlling the valving between the variable load valve inlet and outlet to obtain mechanical advantage in effecting closure of the valving when the brake pressure is at a level commensurate with the vehicle load.

Vehicles employing load dependent, brake force regulation on only one axle, for example the rear axle, are subject to wheel lock-up on the front axle under certain braking conditions. During brake requirements, a partially or fully loaded vehicle has its rear axle brake pressure modulated in accordance with the rear axle load, while full brake pressure is directed to the front axle. Due to the reduced rear axle brake force, the operator may find it necessary to increase the brake pressure to properly control the vehicle, thus causing the front axle wheels to lock up. In addition, brake shoe lining wear on the front axle wheels is accelerated.

In order to counteract these disadvantages, load dependent or variable load valves of the above type have been developed to withhold brake pressure regulation during the initial phase of a relatively heavy brake application, or throughout the brake process during a relatively light brake application. These developments rely upon preadjustment of components at the factory and thus have the disadvantage of not being able to be adjusted in the field for adaptation to different conditions of vehicle utilization except by disassembly of the device.

In copending application, Ser. No. 139,616, assigned to the assignee of the present invention, there is provided an arrangement by which an external adjustment can be made to set the desired level of normal brake pressure development prior to initiation of load-dependent brake pressure regulation. Such an arrangement permits field adjustment to accommodate different conditions of use of the vehicle, but introduces the possibility of the normal brake pressure development being adjusted such as to adversely affect the range of load-dependent pressure regulation. For example, the adjustment might be such that the initial brake pressure development continues until a relatively high pressure is reached before the load-adjustment pressure phase begins. In such a case, only a relatively short range of load-dependent brake pressure regulation is possible, and depending upon the condition of use of the vehicle, may be undesirable.

SUMMARY OF THE INVENTION

Accordingly, the object of the present invention is to modify the external adjustment arrangement mentioned above in such a way that the final load-dependent brake pressure can be kept within a predetermined range, while at the same time permitting the initial brake pressure development to be varied.

In accomplishing this objective, a control piston and a compensating piston of the variable load valve device are coaxially arranged and interconnected by an arrangement of two oppositely pivotable levers separated by a movable fulcrum member. One of the levers is engageable with the compensating piston and the other lever is connected to the control piston. A normally seated valve element that is engageable with the compensating piston is unseated in response to actuation of the control piston by the supply of brake pressure to the control piston operating chamber. The unseated valve conducts brake pressure via the unseated valve element to the brake cylinders and to a pressure chamber containing the compensating piston. The force of this pressure acting on the compensating piston is amplified through the lever system to counteract the opposing force of the control piston. When the control piston force is counterbalanced, the compensating piston allows the valve element to be seated, terminating further buildup of brake pressure.

At the end of the one lever opposite its pivot end is a pin that projects through an opening in the casing and is formed with threads to receive an adjusting nut. Between the adjusting nut and a compression spring is a piston via which the spring compression may be adjusted by the threaded pin and nut. This piston is subject to the delivery fluid pressure acting on the compensating piston such as to either counteract or supplement the spring force, thus providing for full adjustment of the normal brake pressure development prior to load-dependent control, without limiting the available control range desired for a specific condition of use of the vehicle.

BRIEF DESCRIPTION OF THE DRAWINGS

This and other objects and attendant advantages will become apparent from the following more detailed explanation, when taken with the accompanying drawings in which:

FIG. 1 is an assembly view in section showing the external adjustment arrangement of the invention, in which the adjustable spring force is counteracted by the effective brake pressure;

FIG. 2 is a partial section view showing an arrangement in which the adjustable spring force is supplemented by the effective brake pressure; and FIG. 3 is a graph showing various characteristic curves of the load-dependent brake pressure realized by the arrangements in FIGS. 1 and 2.

DESCRIPTION AND OPERATION

In the variable load valve body 1, there is situated a control piston 2, the upper chamber 3 of which is connected with the atmosphere. Below the control piston 2, there is a chamber 4 that is connected via an inlet connection 5 to an operator's brake valve (not shown). A valve element 6 forms, in conjunction with a valve seat 7, an inlet valve 6, 7 opening into a chamber 8, and in conjunction with a valve seat 9, an outlet valve 6, 9 venting to the atmosphere. An outlet connection 10 leading to brake cylinders (not shown) also opens into chamber 8. Control piston 2 is connected to a piston rod 11 that passes through valve element 6 and projects into a compensating piston 12, that is coaxial with control piston 2.

At the lower end of piston rod 11, there is attached a fork member 13, to the lower end of which is hinged a lever 15 by means of a pin 14, which lever is also pivotable on a pin 16 fastened to the body 1. In conjunction with a fulcrum member 17 configured as a roller, and a lever 18 pivotable on a pin 19 fastened in the body 1, the lever 15 forms a mechanical amplification device for transmitting the forces arising on control piston 2 and compensating piston 12. Piston 12 is in contact at its lower end with the upper side of lever 18, whereas its upper end serves as the outlet-valve seat 9, which bears on valve element 6. An annular chamber 20 above compensating piston 12 is connected with chamber 8 via a bore 21. A chamber 22 below piston 12 is continuously connected with the atmosphere via an exhaust port and filter 23. A compression spring 24 connects piston 12 with piston rod 11 of control piston 2.

Fulcrum member 17 is supported in a mounting 25 with a guide extension 26. Connected to mounting 25 is a piston rod 27 of a piston 28, in a chamber 29 that is subject to a pressure medium provided by a load-dependent pressure from the pneumatic-cushion bellows (not shown) and introduced via the connection 30.

The slide extension 26 projects movably into a bore in the body. Carried in a recess of the slide extension 26, between the mounting 25 and an adjustable stop, there is situated a pretensioned adjustment spring 32.

The operation of the automatic load-dependent braking-force regulator is as follows:

The compressed air directed into chamber 4 by the brake valve during a brake application passes into chamber 8 via the open inlet valve 6, 7 and then into the brake cylinder via outlet connection 10. Simultaneously, this pressure in chamber 4 lifts the piston 2, which in turn transmits its movement to fulcrum member 17 and lever 18 via piston rod 11, with the fork 13 attached to it and the lever 15 hinged to it by means of the pin 14. In addition, the compressed air passes via bore 21 into annular chamber 20 above piston 12 and forces the latter against the lever 18.

The force of piston 12 sufficient to overcome the opposing force of the lever 15 controlled by the piston 2 now depends on the position of the support 17, which is determined by the movement of control piston 28 controlled by the air-cushion pressures via the connection 30. As soon as this occurs, piston 12 moves downward, allowing valve element 6 to close the inlet valve 6, 7.

On partial release of the braking, control chamber 4 is partially vented. This disturbs the force equilibrium on piston 12. The pressure in chamber 20 prevails and moves piston 12 downward, thereby disengaging valve element 6 to open outlet valve 6, 9 until a new state of equilibrium is reached. On further decrease in pressure in chamber 4, the release of brake pressure is effected in the same manner until the pressure in both chambers 4 and 20 is depleted. A relief valve (not shown) may be employed to assure that no residual pressure remains in outlet connection 10, when the pressure at inlet connection 5 has been depleted.

If there is no longer any brake pressure present, then the piston 2 is released. Its force working against the downward pressure of piston 12 is lost, whence the piston 12 is moved downward further by the pressure still present in chamber 20. By this action, the outlet valve 6, 9 opens and the brake cylinders are vented through a bore in piston 12 and via a vent 23. Since the chamber 20 also becomes free of pressure, the spring-loaded piston 12 again moves upward, lifting the valve element 6, thus opening inlet valve 6, 7, to restore the variable load valve device to its original release position.

In accordance with the invention, there is attached to the one lever 18 a pin 33 that projects through an opening formed by casing section 34 in body 1. The projecting end of pin 33 is threaded to receive a nut 37. A spring 35 encircles pin 33 and rests between the body 1 and a piston 36 that bears against nut 37. By adjusting nut 37, the effective length of spring 35 and thus its compressive force may be varied to provide a desired bias on piston 12 in the opening direction of valve element 6.

In FIG. 1, one form of piston 36 is provided with an annular pressure area 38 in a chamber 39 formed by the casing section 34 and piston 36. This chamber 39 is connected with chamber 4 via a passage 40, such that the brake pressure $P_1$ in chamber 4 acts on piston 36 to counteract the compressive force of spring 35 exerted on lever 18 via pin 33.

As shown in FIG. 3, the resulting pressure $P_2$ delivered to the vehicle brakes follows the characteristic curve (b), which has a more shallow slope than that of curve (a), representing the relationship of pressures $P_1$ versus $P_2$ prior to the present invention; i.e., the pressure curve produced by the arrangement of the invention in copending application, Ser. No. 139,616.

In FIG. 2 is shown a piston 36a, which corresponds to piston 36 in FIG. 1, but is arranged with an annular pressure area 38a in a chamber 39a formed by the casing section 34a and piston 36a, so that the brake pressure $P_1$ acts on piston 36a to supplement the compressive force of spring 35a, instead of counteracting it, as in FIG. 1.

The resultant pressure $P_2$ delivered to the vehicle brakes in this arrangement is represented by characteristic curve (c) in FIG. 3, which has a steeper slope than that of curve (a).

In accordance with the present invention, the piston arrangement of FIG. 1 is employed, when it is desired to increase the initial pressure development prior to load-dependent brake control, as by adjusting pin 33 to increase the compression of spring 35. The effect of this is to raise the break point of curve (b) which, however, produces a final load-dependent brake pressure $P_2$ corresponding substantially to brake pressure curve (c), due to the fact that the effect of piston 36, in counteracting the spring force, produces a more shallow pressure curve (b).

Conversely, the piston arrangement of FIG. 2 is employed, when it is desired to decrease the initial pressure development prior to load-dependent brake control, as by adjusting pin 33 to decrease the compression of spring 35. The effect of this is to lower the break point of curve (c), which, however, produces a final load-dependent brake pressure $P_2$ corresponding substantially to brake pressure curve (c), due to the fact that the effect of piston 36a, in counteracting the spring force, is to produce a steeper pressure curve (c).

Having thus described the invention, what I claim as new and desire to secure by Letters Patent, is:

1. For a vehicle having load-dependent fluid pressure cushion means supporting the vehicle, there is provided a variable load valve device for automatically developing brake pressure in accordance with the vehicle load condition comprising:
   (a) an inlet and an outlet via which the vehicle brake pressure is transmitted;
   (b) a control chamber to which said inlet is connected;
   (c) a delivery chamber to which said outlet is connected, said control and delivery chambers being interconnected to provide the fluid pressure transmission between said inlet and outlet;

(d) a first piston subject to said control chamber fluid pressure for movement in one direction;

(e) a second piston subject to said delivery chamber fluid pressure for movement in a direction opposite said one direction;

(f) lever means for interconnecting said first and second pistons such that the fluid pressure force on said second piston counteracts the fluid pressure force on said first piston with force amplification;

(g) valve means operatively responsive to movement of said first and second pistons in said one direction to establish fluid pressure communication between said control and delivery chambers, and operatively responsive to movement of said first and second pistons in said opposite direction to interrupt fluid pressure communication between said control and delivery chambers;

(h) bias means for urging said second piston in said one direction to prevent said fluid pressure force of said second piston from counteracting said fluid pressure force of said first piston via said lever means until a predetermined level of said fluid brake pressure is established; and (i) auxiliary means including said bias means for automatically varying said bias on said second piston as a function of said control chamber fluid pressure.

2. A variable load valve device, as recited in claim 1, wherein said bias means is adjustable to provide said predetermined level of said fluid brake pressure.

3. A variable load valve device, as recited in claim 2, further comprising load responsive means subject to the fluid pressure of said cushion means for varying said force amplification in accordance with the vehicle load condition.

4. A variable load valve device, as recited in claim 3, wherein said lever means comprises:

(a) a pair of spaced-apart levers, each said lever having a hinged connection with the casing of said variable load valve device;

(b) a fulcrum member disposed in the space between said levers for displacement along the length thereof by said load responsive means;

(c) said second piston being engageable with one of said levers on a side thereof opposite said fulcrum member; and (d) said first piston having a stem portion pivotally connected to the other one of said levers.

5. A variable load valve device, as recited in claim 4, wherein said bias means comprises a spring that acts on said one lever to urge said second piston in said one direction.

6. A variable load valve device, as recited in claim 5, wherein said auxiliary means comprises:

(a) a pin connected at its one end to said lever;

(b) a nut screw-threaded on the other end of said lever;

(c) said spring having its one end bearing against the casing of said valve device; and (d) an auxiliary piston between the other end of said spring and said nut, so that adjustment of said nut on said screw-threaded end of said pin varies the degree of compression of said spring, said auxiliary piston having a pressure area subject to said control chamber fluid pressure to thereby urge said auxiliary piston in a direction to vary said bias on said second piston.

7. A variable load valve device, as recited in claim 6, wherein said pressure area of said auxiliary piston is arranged so that said control chamber fluid pressure acting on said pressure area causes said auxiliary piston to exert a force in a direction opposite said spring force to thereby counteract said bias on said second piston.

8. A variable load valve device, as recited in claim 6, wherein said pressure area of said auxiliary piston is arranged so that said control chamber fluid pressure acting on said pressure area causes said auxiliary piston to exert a force in the same direction as said spring force to supplement said bias on said second piston.

* * * * *